Feb. 11, 1958  D. C. BURDETTE  2,822,927
TRAP TANK
Filed Sept. 9, 1955
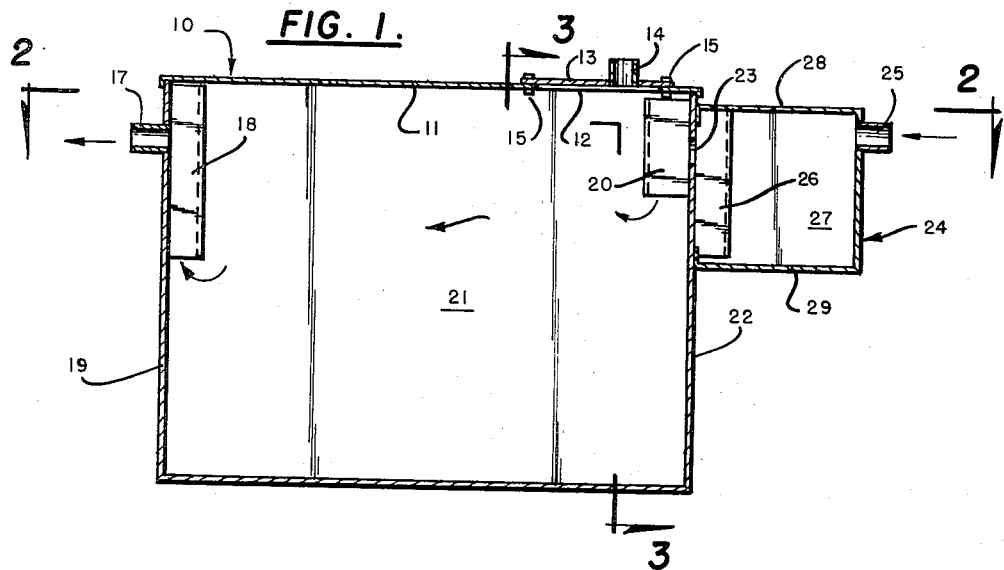
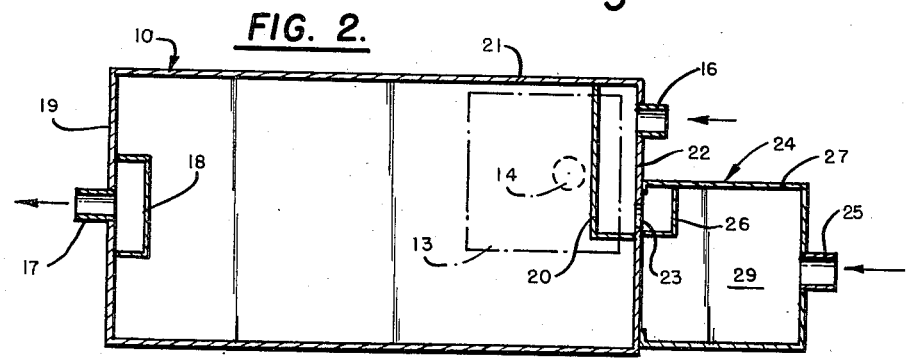
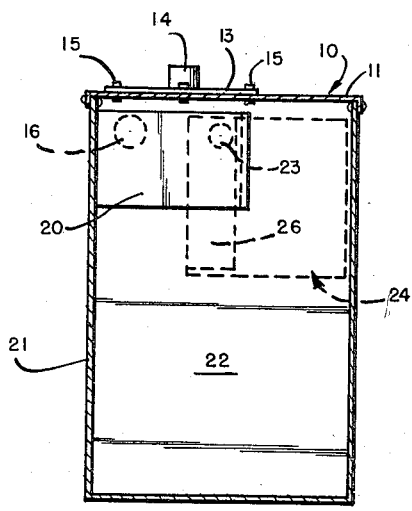
INVENTOR
DOUGLAS C. BURDETTE.

US Patent Office
2,822,927
Patented Feb. 11, 1958

2,822,927

TRAP TANK

Douglas C. Burdette, Aberdeen, Md.

Application September 9, 1955, Serial No. 533,473

1 Claim. (Cl. 210—320)

This invention relates to septic tanks and grease traps.

Conventional grease traps are usually installed under the sink or in the basement of the home in order to separate grease from entering the septic tank, which in time would stop the action of the same. This type of installation suffers from the disadvantage in that the grease trap remains warm and a large quantity of the grease therefore passes right through.

It is accordingly a principal object of the present invention to provide a yard type grease trap which is installed outside of the house in the ground and remains cool at all times to efficiently separate the grease from the water entering the septic tank.

It is another object of the present invention to provide a combination septic tank and grease trap to thereby eliminate extra digging, piping and effect an economy of labor and material in the construction of septic tanks and grease traps.

Other objects of the invention are to provide a combination septic tank and grease trap bearing the above objects in mind which is of simple construction, has a minimum number of parts, is inexpensive to manufacture and efficient in operation.

For other objects and a better understanding of the invention, reference may be had to the following detailed description taken in connection with the accompanying drawing, in which:

Figure 1 is a vertical sectional view of a preferred embodiment of the present invention;

Fig. 2 is a horizontal sectional view thereof taken along the line 2—2 of Fig. 1; and Fig. 3 is a vertical sectional view taken along the line 3—3 of Fig. 1.

Referring now more in detail to the drawing, 10 indicates generally a septic tank having a top wall 11 having a clean out opening 12 and over which is secured the clean out door 13 having the air vent 14 by means of the bolt assemblies 15, substantially as illustrated.

As shown in Fig. 2, the septic tank 10 includes the usual inlet 16 as well as the outlet 17.

An outlet baffle 18 open at top and bottom and of U-shaped cross section (Fig. 2) is secured to the septic tank end panel 19 behind the outlet 17.

An inlet baffle 20 open at top and bottom and of L-shaped cross section (Fig. 2) is secured to the septic tank side panel 21 and septic tank end panel 22 below the clean out door 13, the baffle 20 communicating with the opening 23.

A grease trap indicated generally at 24 is mounted on the end panel 22 of the septic tank, the interior thereof communicating with the opening 23, the grease trap 24 including the usual inlet 25.

An outlet grease trap baffle 26 of L-shaped cross section is secured to the side panel 27 of the grease trap and to the end panel 22 of the septic tank (Fig. 2), the upper end thereof contacting the removable lid 28, while the lower end thereof is freely spaced from the bottom wall 29 of the grease trap. The removable lid 28 will be provided with a suitable handle, not shown, for removing the same and for cleaning the grease trap.

In operation, the sewage line from the building is connected to the inlet 16 of the septic tank 10. The grease trap line from the building is connected to the inlet 25 of the grease trap 24. The liquid empties into the grease trap 24 and separation takes place. The grease floats to the top and the water settles to the bottom. The liquid entering the grease trap is drawn off under the outlet baffle 26 and empties into the septic tank through the opening 23, emptying into the septic tank behind the septic tank inlet baffle 20 so as not to disturb bacteria action of the septic tank.

The unit may be made in all sizes to accommodate the particular disposal job and can be constructed of either steel or concrete. The grease trap may be provided on either the right or left hand side of the septic tank or thereabove to accommodate the building plumbing layout.

While various changes may be made in the detail construction, it shall be understood that such changes shall be within the spirit and scope of the present invention as defined by the appended claim.

What I claim as new and desire to protect by Letters Patent of the United States is:

A device of the class described comprising a septic tank having an inlet at one end and an outlet at the other end, said septic tank at the end thereof having said inlet having an opening therethrough, a grease trap mounted on the end of said septic tank and communicating with said opening, said grease trap having an inlet, a baffle of substantially L-shaped cross section having one leg secured to one side wall of said grease trap and another leg secured to the end wall adjacent said septic tank, the upper end of said grease trap baffle extending from the top wall thereof and the lower end being freely spaced from the bottom wall thereof, an inlet baffle within said septic tank surrounding said opening therein, said septic tank inlet baffle comprising a plate of substantially L-shaped cross section open at top and bottom communicating with said opening, one end of said inlet baffle being secured to the end of said septic tank and the other end of said baffle being secured to one side panel of said septic tank, the said septic tank having an outlet baffle surrounding said outlet therein, said outlet baffle being of substantially U-shaped cross section, said septic tank having a manhole opening and a cleanout door thereabove, bolt means for securing said cleanout door to the septic tank, an air vent in said cleanout door, and a removable lid for said grease trap contacting the upper end of said grease trap outlet baffle.

References Cited in the file of this patent

UNITED STATES PATENTS

| 2,277,718 | Sanders | Mar. 31, 1942 |
| 2,279,813 | Bent | Apr. 14, 1942 |
| 2,692,230 | Hendon | Oct. 19, 1954 |